United States Patent [19]

Hallas

[11] 3,792,551

[45] Feb. 19, 1974

[54] INTEGRATED COVER AND LATCH FOR COMPUTER GATE HOUSING OR THE LIKE

[75] Inventor: Francis J. Hallas, Johnson City, N.Y.

[73] Assignee: International Business Machines Corporation, Armonk, N.Y.

[22] Filed: May 25, 1972

[21] Appl. No.: 256,700

[52] U.S. Cl. .......... 49/463

[51] Int. Cl. .......... E06b 3/32

[58] Field of Search 49/453, 463, 465; 52/507, 509, 52/621

[56] References Cited

UNITED STATES PATENTS

| | | | |
|---|---|---|---|
| 3,692,084 | 9/1972 | Irvine | 49/465 |
| 3,286,412 | 11/1966 | Greig et al. | 49/465 X |
| 2,570,714 | 10/1951 | Robinson | 49/463 |
| 2,558,789 | 7/1951 | Sillman | 49/463 X |

*Primary Examiner*—Kenneth Downey
*Attorney, Agent, or Firm*—John S. Gasper

[57] ABSTRACT

A hingeless cover for a computer gate or other housing comprises a rectangular panel which can be easily snapped into place or removed from an opening in the housing. The panel has integral frame member latch means on opposite edges designed to form channels for receiving the frame members of the housing. The latch means are integral flanges offset to form the channels and to grip the external and internal surfaces of spaced frame members when the cover is in position. Biasing springs attached to the bottom edge of the cover device permit longitudinal displacement of the panel upon application of manual force to the latch means on the opposite edge of the cover. The springs displace the cover upwardly to cause the flanges to latch the cover in place.

6 Claims, 5 Drawing Figures

PATENTED FEB 19 1974 3,792,551

SHEET 1 OF 3

INTEGRATED COVER AND LATCH FOR COMPUTER GATE HOUSING OR THE LIKE

DESCRIPTION OF THE PRIOR ART

In commerce and industry it is a widely adopted practice to have operating equipment such as electronics or electrical devices in an enclosure or cabinet structure. This is particularly the case in business machines where electrical, electronic and other equipments are placed within an enclosure so that it is out of view when the machines are being used. It is important, however, that the enclosures be designed in such a way that the enclosed equipment can be easily reached for service, maintenance or replacement.

In data processing system hardware, the operating equipment is packaged in subassemblies referred to as modular units. It is a well-known practice to assemble modular units within one or more compartmentalized units often referred to as electronic or logic unit gates. These gates are basically a subhousing unit mounted on hinges within an external cabinet. The individual modules of electronics devices for the computer system are mounted within the compartments of the gate. Each compartment of the gate in effect is an enclosure for one or more of the modular assemblies although most gates are designed so that the individual compartments are open internally to permit easy electrical interconnection as well as cooling from a common source. A cover device is mounted on the gates for each compartment.

Heretofore, compartment gate covers have been relatively complex in construction, thereby making cost of fabrication high. Most covers were hingably mounted to the gate structures. It was recognized that better access was provided if the covers could be totally removed. Where hinged constructions are involved, designs were further complicated and access to the compartment for in-place service or removal of electronic components was very much impeded.

SUMMARY OF INVENTION

It is therefore an object of this invention to provide an improved cover device for cabinet or enclosure assemblies.

It is a more particular object to provide an improved cover device for use in data processing machines.

It is a further object of this invention to provide a cover device which is readily placed into position and removed and which will be structured to provide maximum opening space for accessing interior equipments.

It is a still further object of this invention to provide a cover device which will be relatively inexpensive to manufacture and assemble.

It is a still further object of this invention to provide a cover device which is a compact unit requiring no special tools for insertion and removal and can provide good air sealing for cooling interior structures.

In accordance with this invention, the above and other objects are realized by providing a cover device which is basically a single panel element having integral latch means. The upper and lower edges of the panel are provided with rigid interior and exterior flanges which are spaced apart to form channel-like structure which are adapted to receive and latch the cover to the frame members of the basic cabinet structure. The flanges are designed to engage interior and exterior surfaces of the frame members to thus latch the cover in place. The flanges are further designed to permit easy insertion and removal of the cover device into the opening of the cabinet structure. Resilient means, preferably leaf springs, are attached to the cover panel on one edge within the channel. This causes the panel to be displaceable in the direction of the plane of the panel, i.e. longitudinally, to allow snap insertion and removal of the cover device. One end of the cover device is provided with flange extensions for gripping manually. In a preferred embodiment the gripping flanges are spaced apart and in line with the resilient means so that when manual pressure is applied, it is applied in a direct line to the resilient means.

With such a structure the panel and latch means can be molded as a single piece. Consequently, the cost of fabrication is greatly reduced. No hinges are required for such a construction. Consequently, the opening of the housing to be covered is completely free of structures or mechanisms which would act as an impediment to operator access to the internal pieces of equipment. The sealing means can readily be applied to the cover in the channel portions for air sealing the interior housing.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
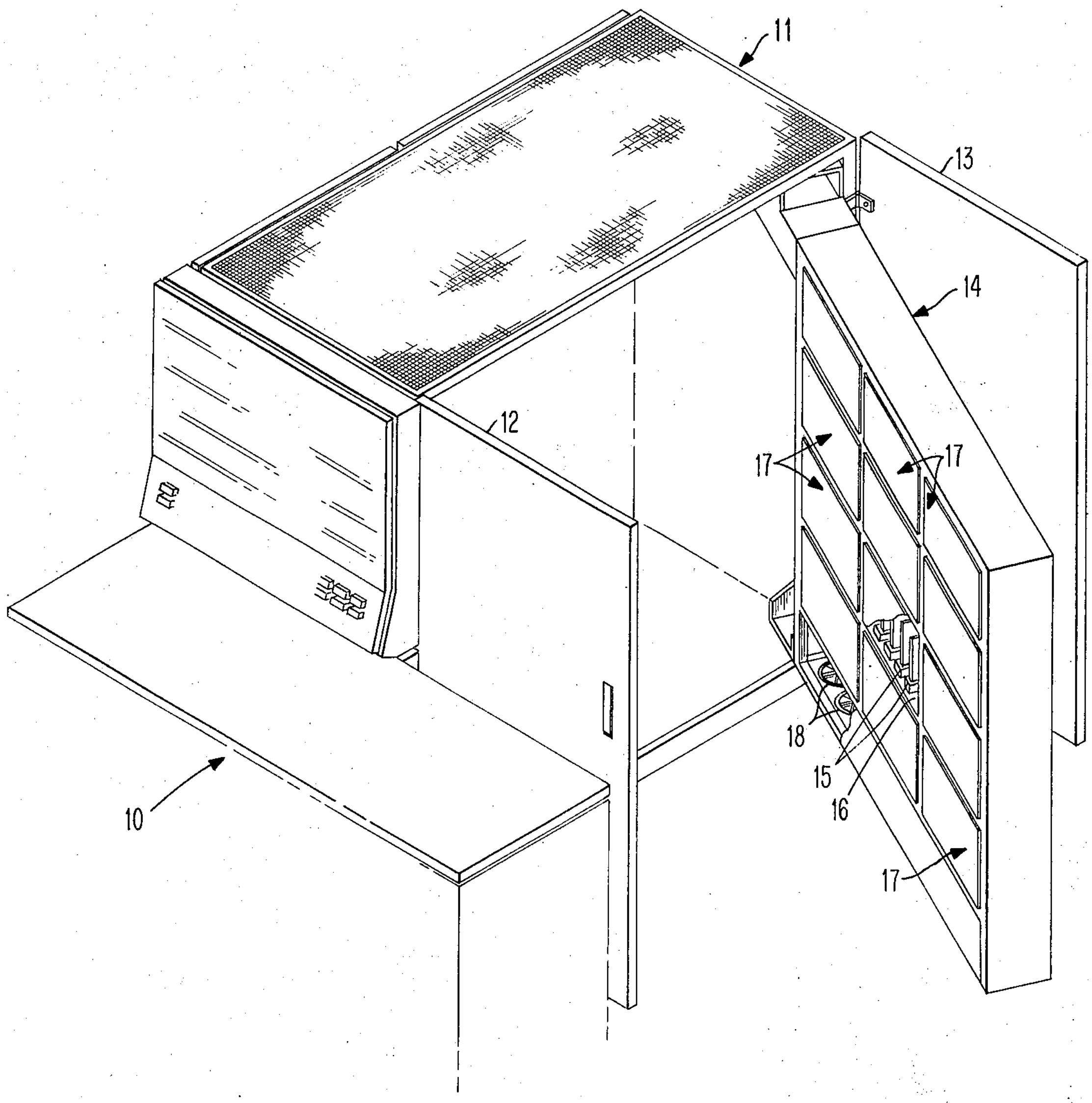
FIG. 1 is a three-dimensional view of a data processing cabinet structure having an electronic gate assembly in which the invention is used.

A computer apparatus is shown in FIG. 1 as comprising a console portion 10 and a related cabinet structure 11. A pair of panel doors 12 and 13 supported by suitable hinges swing open to provide access to the interior of the cabinet 11. The electronics for the computer console, as well as associated systems elements, are contained within a computer logic gate 14 which in turn is mounted by suitable hinge mechanisms to permit it to be rotated in gate-like fashion from inside the cabinet 11 to an access position external to the cabinet. Electronics subassemblies, for example, logic pages 15, are mounted within the gate 14 in various sections or compartments 16 enclosed by hingeless cover devices 17. Cooling units such as fans 18 may be mounted in the bottom compartment of the gate 14 to supply cooling air through the interior structure of gate 14. In accordance with this invention, the various cover devices 17 are designed to be easily assembled to the various compartments 16 of gate 14 without the use of special tools to permit free access to service the logic pages 15, as well as other electronic subassemblies within the compartments.

Figure 2:
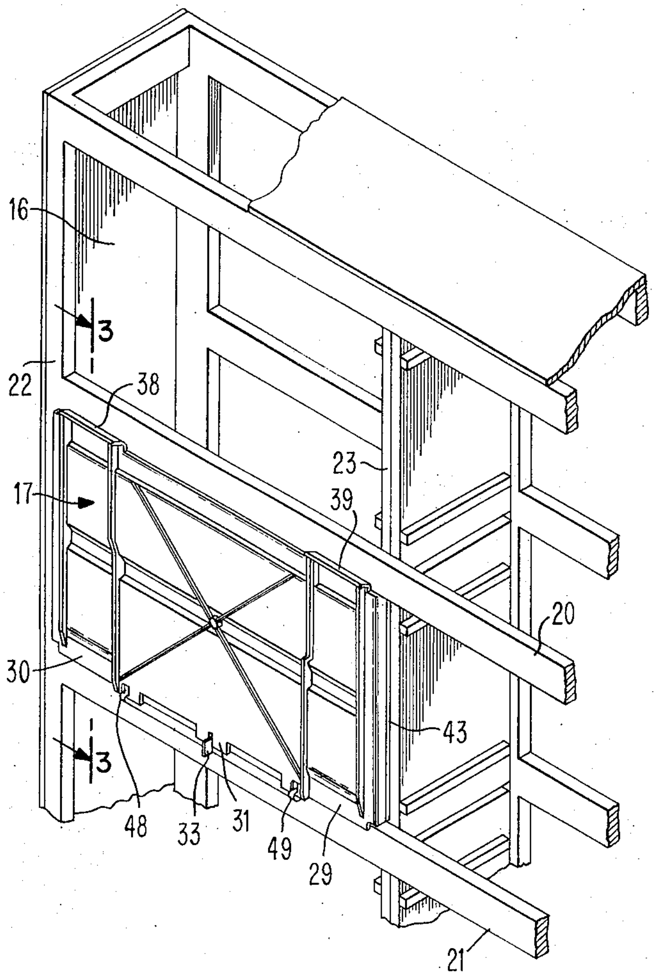
FIG. 2 is a three-dimensional drawing of a portion of the electronic gate assembly of FIG. 1 showing one application of the cover device of this invention.

As seen in FIG. 2, computer gate 14 consists of framework designed to subdivide the interior volume of gate 14 into plural columns and rows of compartments. Much of the detail of actual structure to provide the compartments, as well as hardware mounted therein for supporting electronic subassemblies, has been eliminated from the drawings to simplify the description. In order to illustrate the structure of the cover device of this invention only certain elements of the framework structure will be described, it being understood that other equivalent structures could be made and utilized for practicing the present invention.

As seen in FIG. 1, each compartment has an opening to be covered which permits access to the interior of the gate 14. Illustratively, an opening to a compartment 16 is formed by horizontal frame members 20 and 21 and vertical frame members 22 and 23. Desirably, each compartment opening, both front and rear, would have substantially identical construction in order that the cover device 17 could be used for any of the compartments, thereby providing for uniformity suitable for large scale production of the cover devices. As the cover device 17 of this invention is utilized it is designed to be mounted in a substantially hingeless manner to the horizontal frame members such as members 20 and 21.

Figure 3:
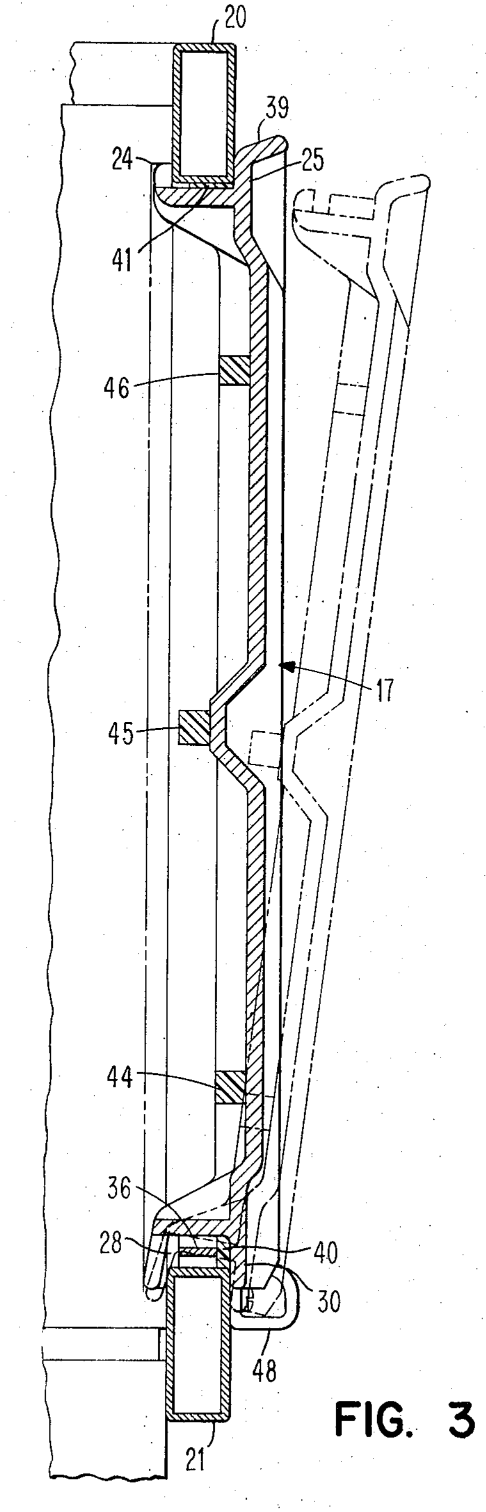
FIG. 3 is an enlarged section taken along line 3—3 of FIG. 2 showing the cover device of this invention in position on the frame members of one compartment of the electronic gate of FIGS. 1 and 2.
Figure 4:
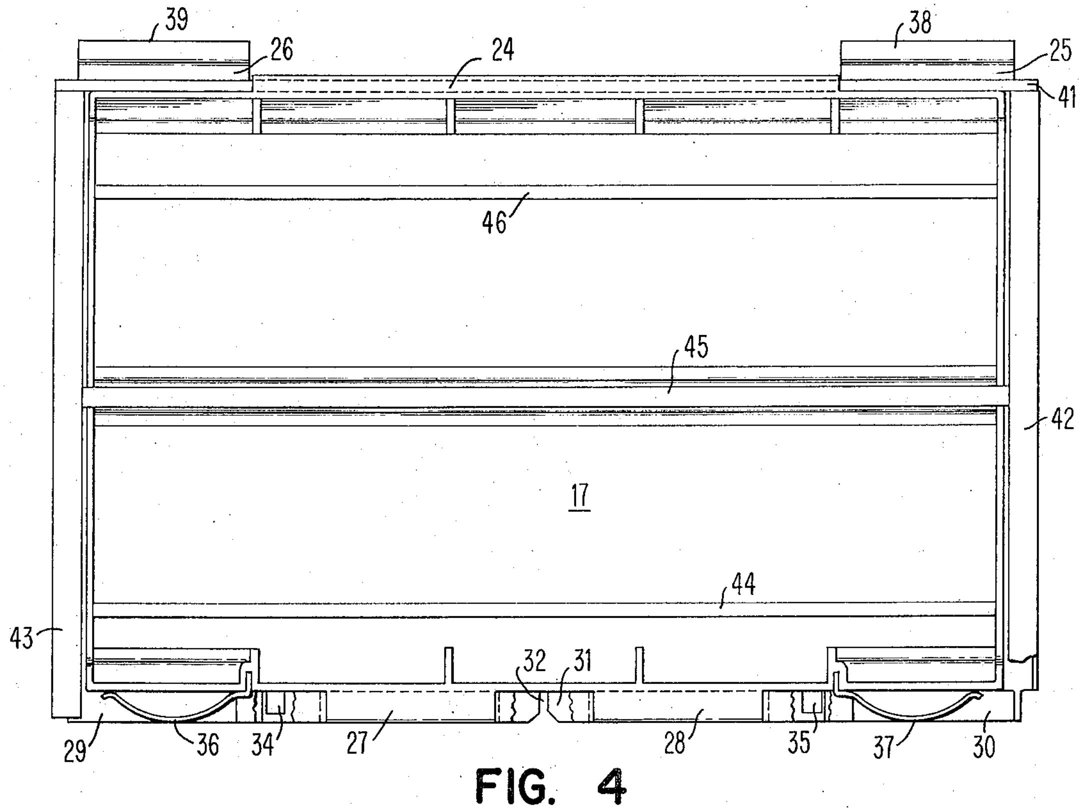
FIG. 4 is a plan view of the cover device as seen from the inside of FIG. 2.
Figure 5:
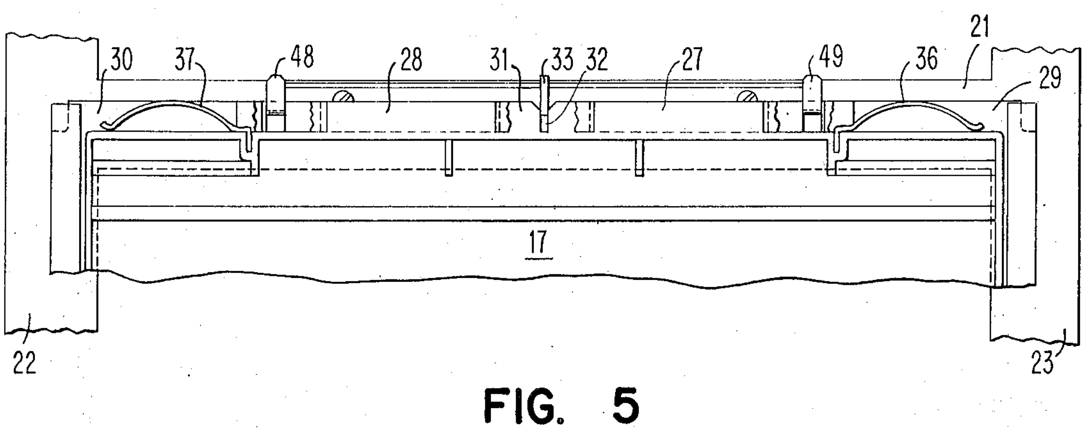
FIG. 5 is a portion of a plan view of the cover device of this invention when it has been removed from an opening of the electronic gate of FIG. 2 and allowed to be suspended on hook members provided for that purpose.

The specific details of the cover device 17 and its cooperation with the frame members 20 and 21 of the framework of computer gate 14 can best be understood by reference to FIGS. 3 and 4. As seen in these figures, cover device 17 is basically a rectangular flat panel having latch means on the upper and lower edges thereof for releasably gripping frame members 20 and 21 of a computer gate 14. The latch means on the upper edge of cover device 17 comprises interior flange 24 and exterior flanges 25 and 26. Flange 24 is offset from flanges 25 and 26, which are essentially co-planar. By this offsetting arrangement flanges 24, 25 and 26 essentially form a channel for receiving frame member 20 to permit the flanges to engage the interior and exterior surfaces of said member. The frame member latch means on the bottom edge of cover device 17 comprises interior flanges 27 and 28, and exterior flanges 29, 30 and 31. Interior flanges 27 and 28 are offset from exterior flanges 29, 30 and 31 to form a channel for receiving frame member 21. It will be noted that exterior flange 31 has a slot 32 designed to receive an aligner flange 33 attached to the front of frame member 21. External flange 31 is located on cover 17 such that the aligner slot 32 is essentially on the geometrical center line for cover device 17. Also, external flanges 29 and 30 have apertures 34 and 35 designed to receive hooks 48 and 49 which are attached to the front of frame member 21 whereby cover device 17 may be suspended (as seen in FIG. 5) from the frame member 21 when cover device 17 has been removed from the opening of a compartment 16. It is to be noted that interior flanges 27 and 28 on the bottom edge of cover device 17 are canted outwardly from the vertical. This provides a slight enlargement to the channel formed with the external flanges 29, 30 and 31 to permit the insertion of the bottom edge of cover 17 onto frame member 21 at an angle followed by subsequent rotation of cover 17 into and out of the opening of compartment 16.

Also attached to the bottom edge of cover 17 are a pair of resilient leaf springs 36 and 37. The springs are located adjacent external flanges 29 and 30 in position to bear on the upper surface of frame member 21. It will be noted that the springs 36 and 37 have a bow construction and each spring has one end fixably attached to the cover device within the channel portion of cover 17. The other end of springs 36 and 37 are free and can move laterally relative to the cover device when subjected to a compression force. The function of the leaf springs 36 and 37 is to apply a bias to the bottom of the cover 17 to displace it upwardly such that interior flange 24 and external flanges 25 and 26 on the upper edge of cover 17 engage the interior and exterior surface of frame member 20 when cover 17 is in position. In accordance with this invention it is also to be noted that the springs 36 and 37 are located on opposite sides of the center line of cover device 17 and preferably near the bottom corners so that a substantially uniform displacement force is applied to the bottom edge of the cover.

In accordance with this invention cover device 17 is placed into or removed from the opening between members 20 and 21 manually. For this purpose exterior flanges 25 and 26 are provided with finger grips 38 and 39, respectively, which extend outwardly from their respective flanges. Also, these grips with their flanges are positioned proximate the corners of the upper edge of the cover 17. This permits the force applied manually by an operator to be transmitted in a direct line to the leaf springs 36 and 37 on the bottom of the cover 17. With this arrangement the cover 17, once groove 32 has been aligned with flange 33, is quickly snapped into position or removed from the opening between the frame members 20 and 21.

In accordance with the preferred embodiment of this invention the cover device is utilized with a computer gate such that an air seal is provided around the edges of cover 17. This is achieved by the use of a resilient strip 40 along the bottom edge of the cover inside the external flanges 29 and 30 such that it is resiliently compressed on the upper surface of frame member 21. An air seal strip 41 substantially the same type is provided along the upper edge of cover 17 between flanges 24, 25 and 26 such that it is caused to be compressed into contact with the bottom surface of frame member 20 when cover 17 is in position. Air seal strips 42 and 43 are applied along the side edges of cover 17 to be compressed when in contact with the vertical frame members 22 and 23 of gate 14.

In the specific application as a cover for a computer gate, cover device 17 further has horizontal pressure and air seal strips 44, 45 and 46 on the interior surface thereof to make contact with mechanisms such as the electronics pages within the compartment when cover 17 is in place.

From the above it will be seen that the cover device structure is relatively simple, requires no moving parts and is readily fabricated using automated techniques. In particular, cover device 17 is preferably made from plastic and may be molded as a single piece. Such an arrangement, the dimensioning, the sizing of the various flanges, as well as their location, can be vary precisely determined. Using a molding construction the cover device can be provided with various grooves and rib constructions describing the panel structure such that it will not readily bend even though the covers can be fairly large panel size. The particular plastic material suitable for use in this cover device is acrylonitrile-butadiene-styrene (ABS). The cover device as illustrated is basically hingeless. Consequently, it is readily removed and inserted into place on the cabinet. When in place, it is held firmly in position by action of the biasing springs and the various frame gripping flange elements. Insertion and removal is performed entirely manually with limited effort and requires no special tools. At the same time, if it is desired, the cover can be suspended on the cabinet to which it is attached when working on the interior portion of the cabinet. Because the biasing elements are attached to and carried by the cover and since no special hinge structures are required, the opening is essentially unencumbered and access to the interior part of the cabinet or housing structure is free and permits easy access for in-place service activities. At the same time, if there are no hinge or holding elements attached to the frame, the opening is clear for complete removal of assemblies within the housing. Further, with this structure the cover device when in place is firmly held so that fixing elements such as screws or locks are not required, thus, the need for special tools to remove or place the cover firmly in position is not required.

While this invention has been described specifically for use in connection with a computer gate type of housing structure, it is readily apparent that it could be applied without departing from the spirit or scope of the invention to other kinds of structures.

While the invention has been particularly shown and described with reference to a preferred embodiment thereof, it will be understood by those skilled in the art that the foregoing and other changes in form and details may be made therein without departing from the spirit and scope of the invention.

I claim:

1. A cover device comprising a rectangular panel element, said panel element being of a size to cover a rectangular opening in a cabinet or the like, said opening of said cabinet being defined by parallel frame members, said panel element having integral latch means on opposite edges thereof for releasably latching said panel element in position over said opening comprising substantially rigid inner flange means on said edges of said panel element for engaging the interior surfaces of said frames and substantially rigid outer flange means on said opposite edges of said panel element for engaging the exterior surfaces of said frame members, said inner and outer flange means on said sheet element forming channels on said opposite edges of said sheet element for receiving said frame members, said channels having a depth sufficient to permit longitudinal displacement of said panel element relative to said frame members whereby said inner flange means on one edge of said panel element can be moved clear of its correlative frame member and through said opening, and resilient means attached to said panel element within one of said channels for bias displacement of said panel element in the longitudinal direction whereby said inner flanges on both edges overlap and engage the interior surfaces of said parallel frame members when said panel element is in position in said opening.

2. A cover device in accordance with claim 1 in which said outer flange means on the edge opposite said resilient means further includes integral grip means for manually engaging said panel element along one edge thereof and for applying a displacement force to compress said resilient means to permit rapid emplacement and removal of said panel element means from said opening.

3. A cover device in accordance with claim 2 in which said manual grip means is in line with said resilient means.

4. A cover device in accordance with claim 3 in which said grip means comprise a pair of extensions from one of said outer flange means and spaced apart near opposite ends of said rectangular panel element and said resilient means comprise spaced apart leaf springs within said channel in line with said flange extensions.

5. A cover device in accordance with claim 1 in which said interior flange of the channel holding said resilient means is slanted away from its cooperating outer flange means to provide clearance for rotation of said panel element in a hingeless manner over its correlative frame member.

6. A cover device in accordance with claim 5 which further includes a resilient material within said channels for providing an air seal between said frame members and said cover device, said resilient material being compressible with said biasing means by said manual force applied to said grip means.

* * * * *